United States Patent
Kassner

(10) Patent No.: US 7,905,091 B2
(45) Date of Patent: Mar. 15, 2011

(54) METHOD AND DEVICE FOR CONTROLLING OR REGULATING THE BOOST PRESSURE OF AN INTERNAL COMBUSTION ENGINE HAVING A COMPRESSOR

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 581 days.

(21) Appl. No.: 11/661,641

(22) PCT Filed: Jul. 13, 2005

(86) PCT No.: PCT/EP2005/053361
§ 371 (c)(1),
(2), (4) Date: Sep. 10, 2007

(87) PCT Pub. No.: WO2006/024577
PCT Pub. Date: Mar. 9, 2006

(65) Prior Publication Data
US 2008/0196404 A1 Aug. 21, 2008

(30) Foreign Application Priority Data
Sep. 1, 2004 (DE) .................. 10 2004 042 272

(51) Int. Cl.
*F02B 33/44* (2006.01)
*F02B 37/12* (2006.01)
*F02D 23/00* (2006.01)

(52) U.S. Cl. ........... 60/605.1; 60/602; 60/611; 60/605.2

(58) Field of Classification Search ............... 60/605.1, 60/602, 605.2, 611; *F02B 37/12, 37/16, F02B 37/18*
See application file for complete search history.

(56) References Cited

U.S. PATENT DOCUMENTS

| | | | | |
|---|---|---|---|---|
| 4,817,387 A * | 4/1989 | Lashbrook | .................... | 60/611 |
| 6,378,306 B2 * | 4/2002 | Koelle et al. | ................. | 60/605.1 |
| 6,401,457 B1 | 6/2002 | Wang et al. | .................... | 60/602 |
| 6,480,782 B2 * | 11/2002 | Brackney et al. | ............ | 60/605.2 |
| 6,662,562 B2 * | 12/2003 | Engel et al. | .................... | 60/602 |
| 6,804,601 B2 * | 10/2004 | Wang et al. | .................. | 60/605.2 |
| 7,461,508 B2 * | 12/2008 | Rosin et al. | .................... | 60/612 |
| 2001/0032466 A1 | 10/2001 | Waszkiewicz et al. | ......... | 60/602 |
| 2005/0132705 A1 | 6/2005 | Boley et al. | ................. | 60/605.1 |

FOREIGN PATENT DOCUMENTS

| | | |
|---|---|---|
| DE | 41 07 693 | 9/1992 |
| DE | 100 10 978 | 9/2001 |
| DE | 100 34 789 | 1/2002 |
| DE | 101 56 839 | 6/2003 |
| DE | 101 60 469 | 6/2003 |
| DE | 102 50 319 | 10/2003 |
| EP | 0 454 943 | 11/1991 |
| EP | 0 952 454 | 10/1999 |

OTHER PUBLICATIONS

A Machine Translation of DE 101 56 839 A1, published on Jun. 12, 2003.* A Machine Translation of KR 2003-0030463 A (which is equivalent to KR 435743 B cited in the IDS filed on Feb. 27, 2009), published on Apr. 18, 2003.*
Database WPI, Section PQ, Week 200467, Derwent Publications Ltd., London, GB; AN 2003-594966, XP002345700 & KR 435 743 B (Hyundai Motor Co. Ltd.) Jun. 12, 2004. abstract.

* cited by examiner

*Primary Examiner* — Thai Ba Trieu
(74) *Attorney, Agent, or Firm* — Kenyon & Kenyon LLP

(57) ABSTRACT

A method and a device for regulating the boost pressure of an internal combustion engine having a compressor, which set a setpoint boost pressure in a rapid manner and without overshooting. An actuator is provided by which the boost pressure of the compressor is set. An actuating variable for the actuator is determined as a function of a rotational speed of the compressor.

31 Claims, 2 Drawing Sheets

METHOD AND DEVICE FOR CONTROLLING OR REGULATING THE BOOST PRESSURE OF AN INTERNAL COMBUSTION ENGINE HAVING A COMPRESSOR

FIELD OF THE INVENTION

The present invention relates to a method and a device for controlling or regulating the boost pressure of an internal combustion engine having a compressor in an air supply of the internal combustion engine. An actuator is provided for setting the boost pressure of the compressor.

According to another principle, the compressor in the air supply is driven by a turbine via a shaft in an exhaust tract of the internal combustion engine. Compressor, turbine, and shaft form an exhaust gas turbocharger.

BACKGROUND INFORMATION

As described in German Patent Application No. DE 41 07 693 or European Patent Application No. EP 04 54 943, for example, the boost pressure is usually regulated by a regulator forming a manipulated variable as a function of the difference between a setpoint boost pressure and an actual boost pressure. This manipulated variable is used to control either a valve in a bypass bridging the turbine of the exhaust gas turbocharger in the exhaust gas channel (see German Patent Application No. DE 41 07 693) or the adjustable turbine guide vanes having a variable geometry (see European Patent Application No. EP 04 54 943).

Engines are subject to ever increasing demands regarding exhaust gas and consumption parameters. An exhaust gas turbocharger having a variable turbine geometry allows an adjustment to the instantaneous engine operating point to be made by adjusting the turbine guide vanes. Using this technique, a delayed response of the exhaust gas turbocharger (turbo lag) may be reduced and at the same time the efficiency of the engine may be improved. When accelerating, often strong overshooting of the boost pressure occurs, which places high mechanical stress on the turbocharger. In addition, excessive closing of the variable turbine geometry in the acceleration phase may result in an undesirably high exhaust gas counterpressure, which negatively affects the dynamics and the efficiency of the engine.

German Patent Application No. DE 100 10 978 describes a device for regulating the boost pressure of an internal combustion engine having an exhaust gas turbocharger, whose turbine situated in the exhaust channel of the internal combustion engine has a variable geometry, the boost pressure being regulated by adjusting the turbine geometry. A regulator forms a manipulated variable for the turbine geometry as a function of the exhaust gas counterpressure prevailing in the exhaust gas channel upstream from the turbine. In this way the above-described shortcomings are satisfactorily overcome.

An object of the present invention is to provide an alternative method and an alternative device for the above-mentioned boost pressure regulation which ensure that, in the event of a change in the load, the boost pressure follows the desired variation of the boost pressure setpoint value as rapidly as possible without exceeding the boost pressure setpoint value, to protect the compressor and the exhaust gas turbocharger against unnecessarily high loads.

SUMMARY OF THE INVENTION

The above-mentioned object is achieved according to the present invention by ascertaining a manipulated variable for the actuator as a function of the rotational speed of the compressor. If the rotational speed of the compressor is used according to the present invention for deriving a manipulated variable, a very rapid response of the boost pressure regulator to a change in the predefined setpoint boost pressure is achieved. The rotational speed of the compressor responds considerably more rapidly than does the boost pressure to a changed behavior of the controlled system such as a change in the rotational speed, load, or exhaust gas recirculation, or to malfunctions in the actuator system, for example. A predefined setpoint boost pressure may be set without overshooting. The compressor and the exhaust gas turbocharger are thus also protected against overspeed. The use of the exhaust gas counterpressure for deriving the manipulated variable is not necessary here.

In an embodiment of the present invention, a setpoint rotational speed of the compressor is advantageously ascertained by a first regulator from the difference between a setpoint boost pressure and an actual boost pressure, and the manipulated variable for the actuator is derived by a second regulator from the difference between the setpoint rotational speed of the compressor and a measured or estimated actual rotational speed of the compressor. In this way, a boost pressure regulation with lower-level regulation of the rotational speed of the compressor is achieved.

It is furthermore advantageous if the setpoint rotational speed of the compressor is limited to a predefined range. This permits the compressor and the exhaust gas turbocharger to be effectively protected against wear and permanent damage.

DETAILED DESCRIPTION

Figure 1:
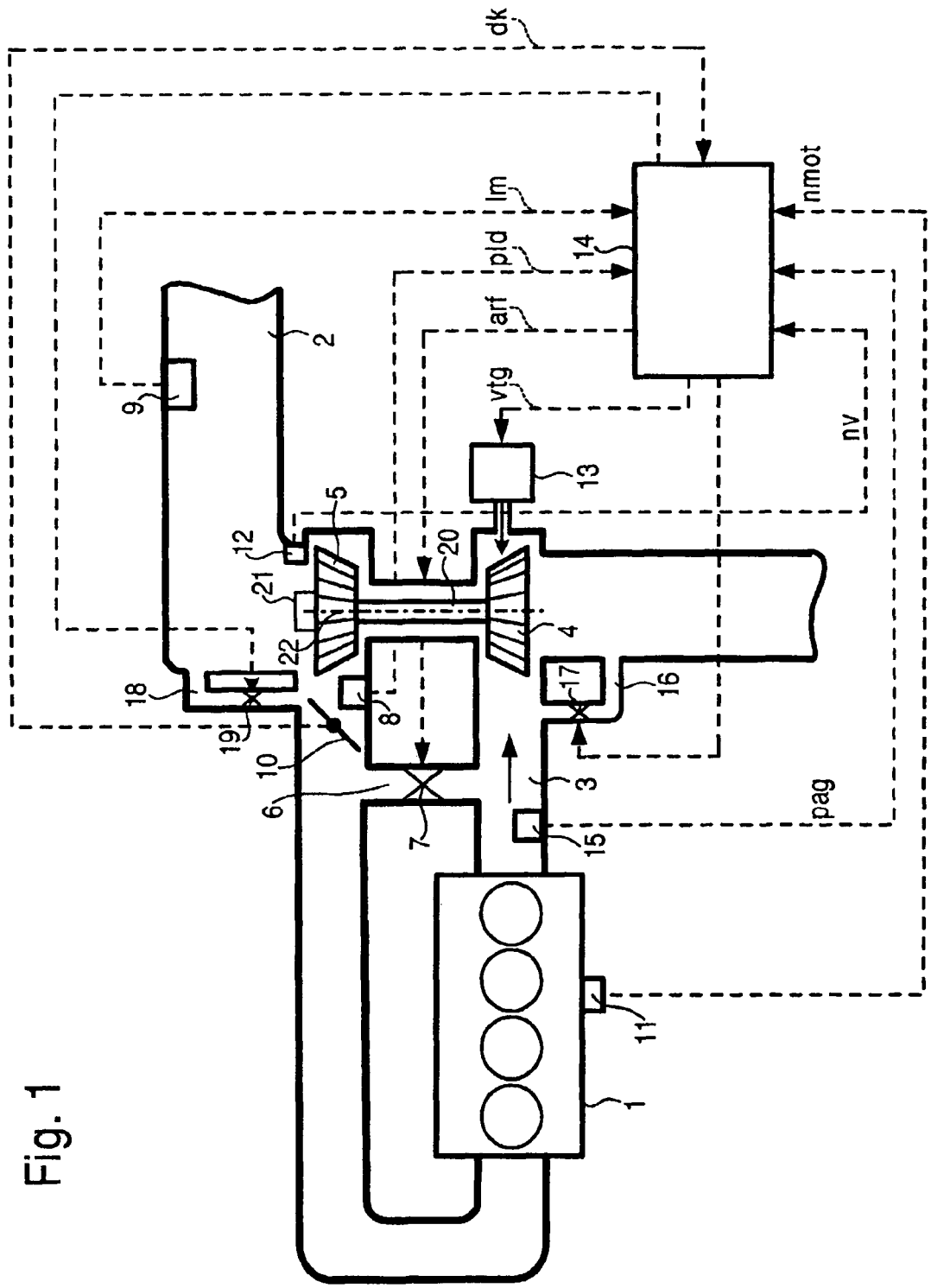
FIG. 1 shows a schematic depiction of an internal combustion engine having an exhaust gas turbocharger.

FIG. 1 shows an internal combustion engine 1 having an air supply 2, designed as an intake channel, and an exhaust gas channel 3. Turbine 4 is situated in exhaust gas channel 3, and compressor 5 of an exhaust gas turbocharger is situated in intake channel 2. Turbine 4 drives compressor 5 via a shaft 20, so that compressor 5 rotates at a rotational speed nv. Furthermore, the internal combustion engine may be equipped with an exhaust gas recirculation channel 6, which connects exhaust gas channel 3 to intake manifold 2. A controllable valve 7 is located in exhaust gas recirculation channel 6. A pressure sensor 8 for measuring boost pressure pld and an air mass sensor 9 for measuring the aspirated air mass lm are situated in intake manifold 2. In addition, a throttle valve 10 is situated in the intake manifold. A sensor 11 detects rotational speed nmot of the internal combustion engine, and a rotational speed sensor 12 in the area of compressor 5 measures rotational speed nv of compressor 5. A pressure sensor 15 in exhaust gas channel 3 measures exhaust gas counterpressure pag upstream from turbine 4. An actuator 13 influences the turbine geometry, i.e., adjusts the turbine guide vanes. This actuator 13 receives a manipulated variable vtg from a control unit 14. Control unit 14 uses engine speed nmot, throttle valve position dk, aspirated air mass lm, boost pressure pld, and rotational speed nv of compressor 5 as input variables for deriving manipulated variable vtg for the turbine geometry. Control unit 14 uses engine speed nmot, throttle valve position dk, aspirated air mass lm, boost pressure pld, and exhaust gas counterpressure pag as input variables for deriving manipulated variable arf for exhaust recirculation valve 7.

Figure 2:
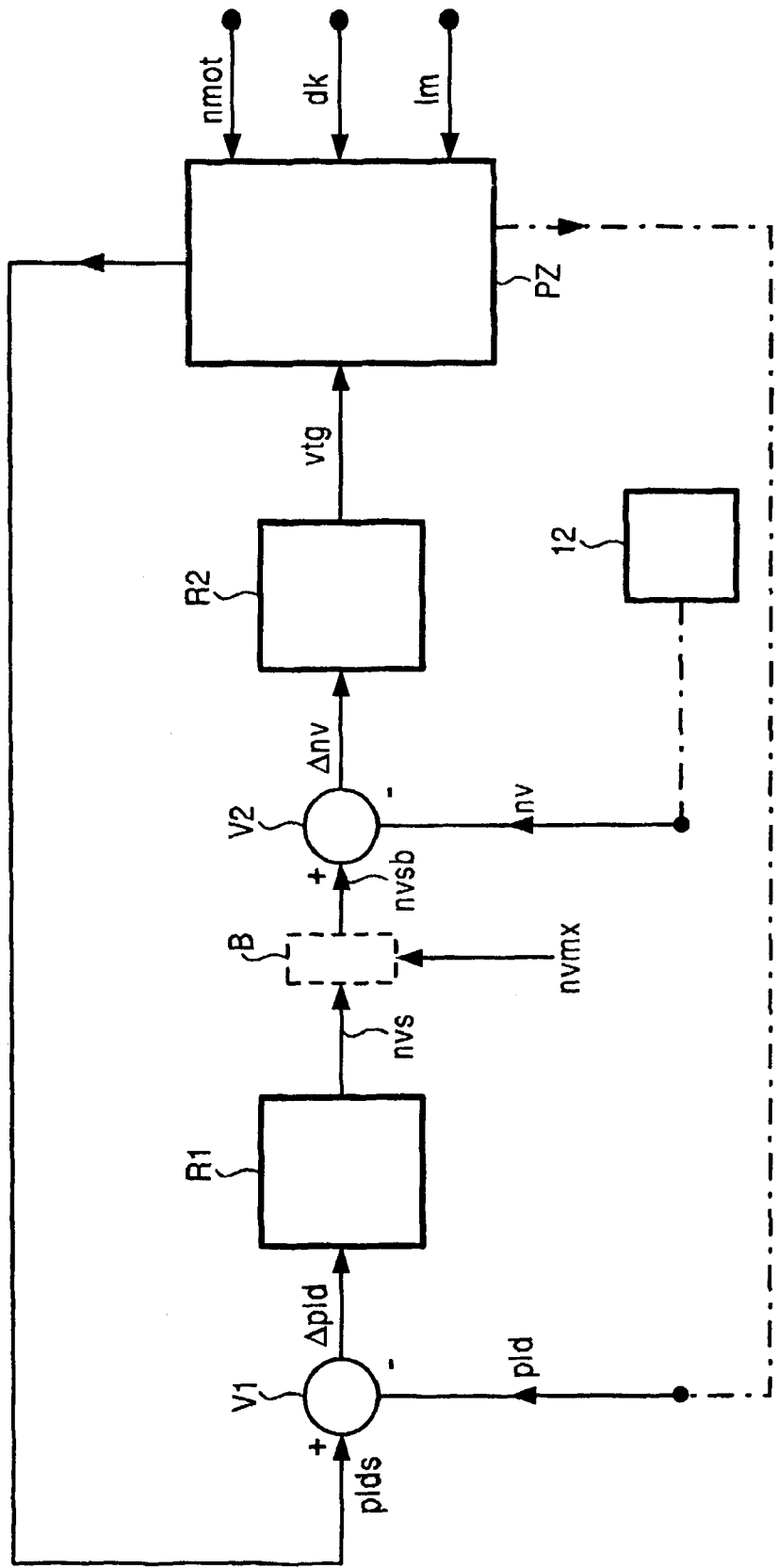
FIG. 2 shows a function diagram for regulating the boost pressure.

We shall elucidate in greater detail with reference to the function diagram of FIG. 2 how control unit 14 derives manipulated variable vtg for the turbine geometry from the above-mentioned input variables. A processor PZ ascertains a setpoint boost pressure plds from engine speed nmot, throttle valve position dk, which reproduces the driver's intent, and possibly from other performance quantities of the engine which are not mentioned here. We shall not provide details of the derivation of the setpoint boost pressure plds, because it belongs to the related art. The difference Δpld between the setpoint boost pressure plds and an actual boost pressure pld is ascertained in a first point of common coupling V1. Difference Δpld for the boost pressure is supplied to a first regulator R1 (for example, PI or PID regulators). The output quantity of first regulator R1 is a setpoint rotational speed nvs of compressor 5.

Optionally, and as indicated in FIG. 2 by shading, a limiting element B may be provided, whose input receives setpoint rotational speed nvs of compressor 5. Limiting element B compares setpoint rotational speed nvs of compressor 5 with a maximum allowable rotational speed nvmx of compressor 5. Limiting element B forms the minimum from setpoint rotational speed nvs of compressor 5 and maximum allowable rotational speed nvmx of compressor 5 and supplies this minimum to a second point of common coupling V2 as the limited setpoint rotational speed nvsb. Limiting element B is thus designed as a minimum selection element. If limiting element B is not used, setpoint rotational speed nvs of compressor 5 is supplied to second point of common coupling V2 without limitation. Maximum allowable rotational speed nvmx of compressor 5 may be calibrated on a test bench, for example, in such a way that an excessive load on the components of exhaust gas turbocharger 4, 5, 20 due to rotational speed nv of compressor 5 is avoided; in particular, permanent damage is reliably prevented. Setpoint rotational speed nvs of compressor 5 is limited by limiting element B to a range defined on one side by maximum allowable rotational speed nvmx of compressor 5. According to the present invention, the rotational speed of compressor 5 is to be taken into account as an additional quantity in regulating the boost pressure. For this purpose, difference Δnv between possibly limited setpoint rotational speed nvs(b) of compressor 5 and actual rotational speed nv of compressor 5 is determined in second point of common coupling V2. Difference Δnv for the rotational speed of compressor 5 is supplied to a second regulator R2 which finally forms manipulated variable vtg for the variable turbine geometry.

In this way, the rotational speed of compressor 5 is taken into account by a compressor speed regulation subordinated to the boost pressure regulation. The boost pressure regulation thus becomes dynamically faster, and system deviations are therefore corrected more rapidly. In addition, the boost pressure regulation becomes sturdier, i.e., changes in the dynamics of internal combustion engine 1, for example, due to changed operating conditions of internal combustion engine 1, modify the control response of the boost pressure regulation to a lesser degree.

Actual boost pressure pld may either be measured by pressure sensor 8 in intake manifold 2 or an estimated value for the actual boost pressure may be derived by processor PZ from different performance quantities of the internal combustion engine. The dash-dotted line in FIG. 2 indicates that actual boost pressure pld is an estimated value ascertained by processor PZ. Actual rotational speed nv of compressor 5 may be a measured value of speed sensor 12 in the area of compressor 5.

Speed sensor 12 may measure rotational speed nv of compressor 5, as known to those skilled in the art, using the Hall effect or the GMR effect (GMR=Giant Magneto-Resistance). Rotational speed nv of the compressor may be measured, for example, in a manner described in European Patent Application No. EP 0952 454. German Patent Application No. DE 102 50 319, for example, describes rotational speed measurement using the GMR effect. The rotational speed of compressor 5 may also be ascertained by measuring the rotational speed of turbine 4 or of shaft 20 in an appropriate manner. In general, the rotational speed of turbine 4 is the same as the rotational speed of shaft 20 and rotational speed nv of compressor 5. In this case, speed sensor 12 is to be situated in the area of turbine 4, i.e., shaft 20, for measuring the rotational speed of turbine 4, i.e., of shaft 20. When making use of the GMR effect, speed sensor 12 cooperates with a permanent magnet 21 situated on a shaft 22 of the compressor, for example, and as indicated in FIG. 1, on an end of shaft 22 of compressor 5. This permanent magnet 21 is magnetized. Speed sensor 12 then includes a measuring element which detects the rotational speed of permanent magnet 21 and thus of shaft 22 of compressor 5 and thus of compressor 5 on the basis of the GMR effect as described in German Patent Application No. DE 102 50 319, for example.

However, an estimated value derived by processor PZ from performance quantities of the internal combustion engine may also be used for actual rotational speed nv of compressor 5. In the present example, however, actual rotational speed nv of compressor 5 is delivered by speed sensor 12.

We shall not describe the possible calculation of the estimated value of actual boost pressure pld and actual rotational speed nv of compressor 5 because methods known from the related art may be used here. We shall only mention that actual rotational speed nv of compressor 5 may be derived from quantities such as actual boost pressure pld, an ambient pressure, and aspirated air mass lm. The required plurality of sensors delivers a relatively inaccurate signal due to the individual tolerances of the sensors. Therefore, in this case, a clear safety margin to maximum allowable rotational speed nvmx of compressor 5 must be observed. This safety margin may be reduced due to the direct measurement of rotational speed nv of compressor 5 with the aid of speed sensor 12 because only the measuring tolerance of speed sensor 12 must be taken into account. The required safety margin may be included in the calculation of maximum allowable rotational speed nvmx of compressor 5, or taken into account in calibrating maximum allowable rotational speed nvmx on the test bench.

Exhaust gas counterpressure pag in exhaust gas channel 3 upstream from turbine 4, and thus also the energy supplied to turbine 4, increases when the turbine geometry is closed. This causes an increase in rotational speed nv of compressor 5 and, at the same time, also of boost pressure pld in intake manifold 2. If exhaust gas recirculation exists as depicted in FIG. 1, opening valve 7 may cause exhaust gas to reach the intake manifold through exhaust gas recirculation channel 6 if exhaust gas counterpressure pag is higher than boost pressure pld. If exhaust recirculation valve 7 is opened, exhaust gas counterpressure pag drops and therefore so does boost pressure pld in intake manifold 2.

The present invention is based on the observation that rotational speed nv of compressor 5 responds to an adjustment of the turbine geometry considerably more rapidly than does boost pressure pld. Boost pressure pld only responds delayed by the time constant of the exhaust gas turbocharger. The dynamics of a regulator for the boost pressure is therefore essentially determined by the moment of inertia of the exhaust gas turbocharger. The time constant here is, however, substantially greater than the time constant of any interference acting upon the system due to the time-variable behavior of the controlled system, to the opening and closing exhaust gas recirculation valve 7, or to defects in the guide system of turbine 4. Interference of the turbine guide system, changes in the valve lift of exhaust gas recirculation valve 7, or changes in the operating point of the internal combustion engine directly affect rotational speed nv of compressor 5 and may therefore be rapidly equalized in the lower-level control circuit using regulator R2. The higher-level control circuit having regulator R1 must be designed to be slower than the lower-level control circuit having regulator R2. However, since boost pressure pld has a higher inertia than does rotational speed nv of compressor 5, this condition is met automatically.

At a low mass flow rate through internal combustion engine 1, the maximum achievable torque or the maximum achievable output power of internal combustion engine 1 is limited by the maximum achievable boost pressure even in the steady-state operation of internal combustion engine 1.

The above example was described with reference to actuator 13, which affects the turbine geometry, i.e., adjusts the turbine guide vanes. Additionally or alternatively, a first bypass valve 17 may also be used as an actuator in a first bypass 16 around turbine 4 which may be present in exhaust gas channel 3 and is depicted in FIG. 1 as an example. The opening cross section of first bypass 16 is influenced in this manner. Additionally or alternatively, a second bypass valve 19 may also be used as an actuator in a second bypass 18 around compressor 5 which may be present in exhaust gas channel 2 and is depicted in FIG. 1 as an example. The opening cross section of second bypass 18 is influenced in this manner.

Since the rotational speed of compressor 5 at least correlates with the rotational speed of shaft 20 and with the rotational speed of turbine 4, the manipulated variable for actuator 13 may also be ascertained similarly by using the rotational speed of shaft 20 or using the rotational speed of turbine 4 instead of the rotational speed of compressor 5. Also in this way, the manipulated variable of actuator 13 is ascertained as a function of the rotational speed of compressor 5.

The above example was described with reference to a control circuit which subordinates another control circuit to a higher-level control circuit. Alternatively, other controls or regulations are conceivable which use actual boost pressure pld as the measured input quantity according to the related art. These controls and regulations should also use actual rotational speed nv of compressor 5 as an additional input quantity. This allows faster correction of the above-described interference and the undesirable overshoot of the boost pressure is prevented. Those skilled in the art are familiar with controls and regulations of this type, for example, as status control.

Also known are controls and regulations that classify the input signals using appropriate mathematical functions and derive control actions therefrom. These methods are known to those skilled in the art as fuzzy regulators. Actual rotational speed nv of compressor 5 should be added as an input quantity to this regulating method.

What is claimed is:

1. A method for at least one of controlling and regulating a boost pressure of an internal combustion engine having a compressor situated in an air supply of the internal combustion engine, the method comprising:
   setting a boost pressure of the compressor using an actuator;
   ascertaining a manipulated variable for the actuator as a function of a rotational speed of the compressor; and
   ascertaining a setpoint rotational speed of the compressor by a first regulator from a difference between a setpoint boost pressure and an actual boost pressure.

2. The method according to claim 1, wherein the manipulated variable for the actuator is ascertained by a second regulator from a difference between a setpoint rotational speed of the compressor and one of a measured and estimated actual rotational speed of the compressor.

3. The method according to claim 1, further comprising:
   limiting a setpoint rotational speed of the compressor to a predefined range.

4. The method according to claim 1, wherein the compressor is part of an exhaust gas turbocharger, and wherein at least one of a variable geometry of a turbine of an exhaust gas turbocharger, an opening cross section of a first bypass around the turbine and an opening cross section of a second bypass around the compressor of the exhaust gas turbocharger is influenced by the manipulated variable.

5. The method according to claim 1, further comprising:
   limiting a setpoint rotational speed of the compressor to a predefined range;
   wherein the compressor is part of an exhaust gas turbocharger, and wherein at least one of a variable geometry of a turbine of an exhaust gas turbocharger, an opening cross section of a first bypass around the turbine and an opening cross section of a second bypass around the compressor of the exhaust gas turbocharger is influenced by the manipulated variable.

6. A device for at least one of controlling and regulating a boost pressure of an internal combustion engine having a compressor situated in an air supply of the internal combustion engine, the device comprising:
   an actuator for setting a boost pressure of the compressor;
   a regulator for ascertaining a manipulated variable for the actuator as a function of a rotational speed of the compressor; and
   a further regulator for ascertaining a setpoint rotational speed of the compressor from a difference between a setpoint boost pressure and an actual boost pressure.

7. The device according to claim 6, wherein the regulator ascertains the manipulated variable for the actuator from a difference between a setpoint rotational speed of the compressor and one of a measured and estimated actual rotational speed of the compressor.

8. A control apparatus for controlling the boost pressure of an internal combustion engine having a compressor in an air supply of the internal combustion engine and having an actuator for setting a boost pressure of the compressor, comprising:
   a processor; and
   a control unit, including the processor, to determine a manipulated variable for a turbine geometry based on input variables for an engine speed, a throttle valve position, an aspirated air mass, a boost pressure, and a rotational speed of the compressor;
   wherein the processor ascertains a setpoint boost pressure from the engine speed and the throttle valve position,
   wherein a difference between the setpoint boost pressure and an actual boost pressure is ascertained in a first point of a common coupling, wherein the difference for the boost pressure is supplied to a first regulator, whose output quantity is a setpoint rotational speed of the compressor, and wherein the control unit derives another manipulated variable for an exhaust recirculation valve based on input variables for the engine speed, the throttle valve position, the aspirated air mass, the boost pressure, and the exhaust gas counterpressure.

9. The control apparatus of claim 8, wherein the setpoint rotational speed of the compressor is supplied to a second point of common coupling.

10. The control apparatus of claim 9, wherein the setpoint rotational speed of compressor is limited by a limiting element to a range defined on one side by a maximum allowable rotational speed of the compressor.

11. The control apparatus of claim 8, further comprising:
a limiting element, which functions as a minimum selection element, whose input receives the setpoint rotational speed of the compressor, wherein the limiting element compares the setpoint rotational speed of the compressor with a maximum allowable rotational speed of the compressor, and wherein the limiting element forms the minimum from the setpoint rotational speed of the compressor and the maximum allowable rotational speed of the compressor and then supplies the minimum to a second point of common coupling as the limited setpoint rotational speed.

12. The control apparatus of claim 8, wherein the rotational speed of the compressor is taken into account as an additional quantity in regulating the boost pressure, wherein the difference between the setpoint rotational speed of the compressor and the actual rotational speed of the compressor is determined in a second point of common coupling, and wherein the difference for the rotational speed of the compressor is supplied to a second regulator which forms a manipulated variable for the variable turbine geometry.

13. The control apparatus of claim 8, wherein the rotational speed of the compressor is taken into account by a compressor speed regulation subordinated to the boost pressure regulation, wherein the boost pressure regulation becomes dynamically faster, so that system deviations are corrected more rapidly, and wherein the boost pressure regulation becomes sturdier, so that changes in the dynamics of the internal combustion engine modify the control response of the boost pressure regulation to a lesser degree.

14. The control apparatus of claim 8, wherein actual boost pressure is measured by a pressure sensor in an intake manifold or is an estimated value for the actual boost pressure as derived by the processor from different performance quantities of the internal combustion engine.

15. The control apparatus of claim 8, wherein the actual rotational speed of the compressor is a measured value of a speed sensor in the area of the compressor.

16. The control apparatus of claim 8, wherein a speed sensor measures the rotational speed of the compressor using the Hall effect or the GMR effect (GMR=Giant Magneto-Resistance).

17. The control apparatus of claim 8, wherein the rotational speed of the compressor is ascertained by measuring a rotational speed of a turbine or its shaft.

18. The control apparatus of claim 8, wherein a speed sensor is situated in an area of a turbine or its shaft for measuring a rotational speed of the turbine or its shaft.

19. The control apparatus of claim 8, wherein an estimated value derived by the processor from performance quantities of the internal combustion engine is used for an actual rotational speed of the compressor.

20. The control apparatus of claim 8, wherein the actual rotational speed of the compressor is provided by a speed sensor.

21. The control apparatus of claim 8, wherein an actual rotational speed of the compressor is derived from at least one of the actual boost pressure, the ambient pressure, and the aspirated air mass.

22. The control apparatus of claim 8, wherein a required safety margin is included in a calculation of a maximum allowable rotational speed of the compressor.

23. The control apparatus of claim 8, wherein a required safety margin is taken into account in calibrating a maximum allowable rotational speed on a test bench.

24. The control apparatus of claim 8, wherein an exhaust gas counterpressure in an exhaust gas channel upstream from the turbine increases when the turbine geometry is closed.

25. The control apparatus of claim 24, wherein there is an increase in a rotational speed of the compressor and of a boost pressure in the intake manifold, and wherein if there is exhaust gas recirculation, an opening valve causes exhaust gas to reach the intake manifold through exhaust gas recirculation channel if the exhaust gas counterpressure is higher than the boost pressure, and wherein if the exhaust recirculation valve is opened, the exhaust gas counterpressure drops and therefore so does the boost pressure in the intake manifold.

26. The control apparatus of claim 8, wherein the rotational speed of the compressor responds to an adjustment of the turbine geometry more rapidly than does the boost pressure, so that the dynamics of a regulator for the boost pressure is essentially determined by the moment of inertia of the exhaust gas turbocharger.

27. The control apparatus of claim 8, wherein the time constant is substantially greater than the time constant of any interference acting upon the system due to the time-variable behavior of the controlled system, to the opening and closing exhaust gas recirculation valve, or to defects in the guide system of the turbine.

28. The control apparatus of claim 8, wherein interference of the turbine guide system, changes in the valve lift of exhaust gas recirculation valve, or changes in the operating point of the internal combustion engine directly affect the rotational speed of the compressor and are rapidly equalized in the lower-level control circuit using a second regulator.

29. The control apparatus of claim 8, wherein a higher-level control circuit having a first regulator is slower than a lower-level control circuit having second regulator, and wherein the boost pressure has a higher inertia than does a rotational speed of the compressor so that this condition is met automatically.

30. The control apparatus of claim 8, wherein an actuator affects the turbine geometry by adjusting the turbine guide vanes, wherein a first bypass valve is used as the actuator in a first bypass around the turbine in an exhaust gas channel to influence an opening cross section of a first bypass, and wherein a second bypass valve is used as the actuator in a second bypass around the compressor in an exhaust gas channel to influence an opening cross section of the second bypass.

31. The control apparatus of claim 8, wherein the rotational speed of the compressor at least correlates with the rotational speed of shaft and with the rotational speed of the turbine, wherein the manipulated variable for the actuator is ascertained by using the rotational speed of shaft or by using the rotational speed of turbine instead of the rotational speed of the compressor, and wherein the manipulated variable of the actuator is ascertained as a function of the rotational speed of the compressor.

* * * * *